Feb. 11, 1941.  L. W. T. CUMMINGS  2,231,493
CHEMICAL REACTIONS AND THEIR CONTROL
Filed March 24, 1938  3 Sheets-Sheet 1

INVENTOR
LELAND W.T. CUMMINGS
BY
Ira L. Nickerson
ATTORNEY

Feb. 11, 1941.   L. W. T. CUMMINGS   2,231,493
CHEMICAL REACTIONS AND THEIR CONTROL
Filed March 24, 1938   3 Sheets-Sheet 3

INVENTOR
LELAND W.T. CUMMINGS
BY
Ira L. Nickerson
ATTORNEY

Patented Feb. 11, 1941

2,231,493

UNITED STATES PATENT OFFICE 2,231,493

CHEMICAL REACTIONS AND THEIR CONTROL

Leland W. T. Cummings, Wyncotte, Pa., assignor, by mesne assignments, to Houdry Process Corporation, Wilmington, Del., a corporation of Delaware Application March 24, 1938, Serial No. 197,769

16 Claims. (Cl. 196—52)

The present invention relates to operations for the treatment or reaction of fluids and to the control and temperature regulation thereof.

It especially concerns operations where a contact mass or catalytic material is employed. The mass or catalyst may, for example, be arranged in any desired number of confined zones and the mass or catalyst in each may be employed in a cycle of operation made up of separate periods having different heats of reaction. Where the cycle is made up of, say, two separate periods, each may have a positive or exothermic heat of reaction or each may have a negative or endothermic heat of reaction or one period may be endothermic and the other exothermic. For example, a particularly contemplated cycle of operation is one where one period has a substantially different heat of reaction from another period of the cycle. The cycle of operation in each reaction zone may be repeated over and over again.

In the carrying out of such an operation, it is usually desired to control the temperature of the reactions and/or of a catalyst or contact mass which may be employed. This is particularly true, for example, in many, if not most, hydrocarbon reactions and in the treatment of various fluids, such as carbonaceous fluids. Endeavors in the past to effect such temperature control have led to various operations which are more or less expensive, complications of apparatus, and large power costs, and, in addition, have frequently entailed disadvantages to the operation as a whole.

It is an object of the present invention to provide important improvements, both process and apparatus, in operations as illustrated above. A further object is to employ a heat exchange medium in controlling treating operations or reactions so as to minimize pumping requirements and power costs. Another object is to maintain reaction zones and/or contact materials under desired temperature conditions cheaply and efficiently. These and other objects and advantages will appear from the description taken as a whole.

While the heat exchange fluid may be composed of various materials, it is advantageous to employ a material which will remain in the liquid phase, or at least to large extent if not substantially completely in the liquid phase, during use.

In controlling the temperature of catalyst or contact material during a fluid treating operation, tubular heat exchange members may extend within, or in heat exchange relation with, such contact material. Heat exchange fluid may be circulated through such tubular heat exchange members or, when desired, may be maintained therewithin in a quiescent state (i. e. without circulation) during any desired portion of any one or all of a series of cycles of operation. The heat exchange fluid may be circulated and/or maintained, as the case may be, in heat circulating relation with the mass or catalyst. In such event, the temperature of the heat exchange fluid may be fairly close to the temperature of the catalyst or mass, differing from the latter sufficiently to effect the desired exchange of heat between the mass and the heat exchange fluid and so as to control the temperature of the catalyst.

Without intending to limit my invention but simply to illustrate the same, reactants treated may consist of or include various fluids such as hydrocarbons, which latter may be of petroleum, coal, shale or other origin, natural or synthetic. A cycle of operation may be employed in effecting the desired treatment having, for example, one period with a substantial heat of reaction which is positive or exothermic and another period which has a relatively low heat of reaction, either endothermic or exothermic; although the present invention also applies where in one period there is a large endothermic heat of reaction whereas the other or another period of the cycle is attended by a slight heat of reaction. The contact material or catalyst will depend upon the particular circumstances and character and extent of the reactions desired and will be illustrated hereinafter. The heat exchange medium may consist or contain various materials which, in a preferred aspect of this invention, will remain substantially in liquid phase throughout all or substantially all of each cycle of operation. Among heat exchange fluids which may be employed, depending upon circumstances, are various metal alloys, mercury, diphenyl, fused salts, fused hydroxides, etc.

An understanding of illustrative aspects of this invention can be had by reference to the accompanying drawings in which.

Figure 1:
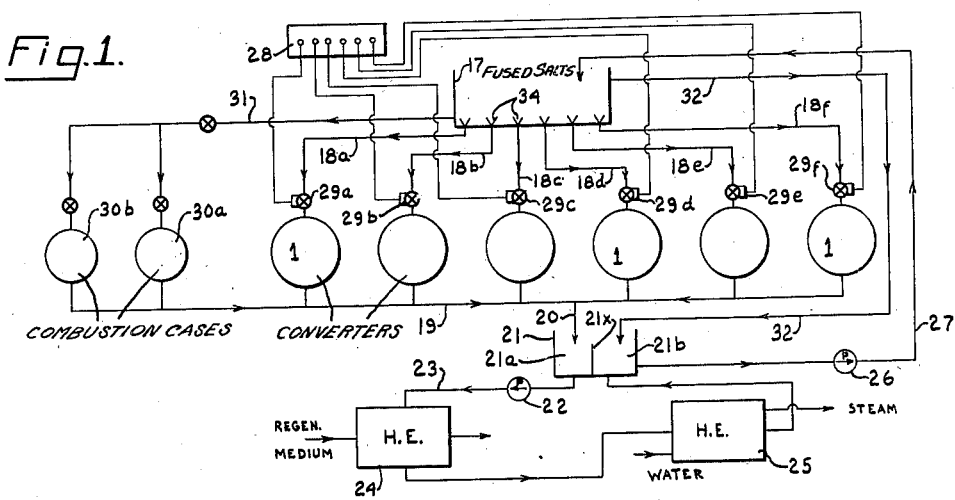
Fig. 1 is a diagrammatic showing of apparatus for the treatment or transformation of reactants.

Referring more in detail to the drawings, in the several figures thereof like reference characters will be employed to denote similar parts. Also a discussion of the illustrative aspects of the process of the present invention will be combined with the description of the illustrative apparatus of this invention shown.

In Fig. 1, 1 designates converters, of which six are shown, although any other number might be employed, as desired.

Figure 4:
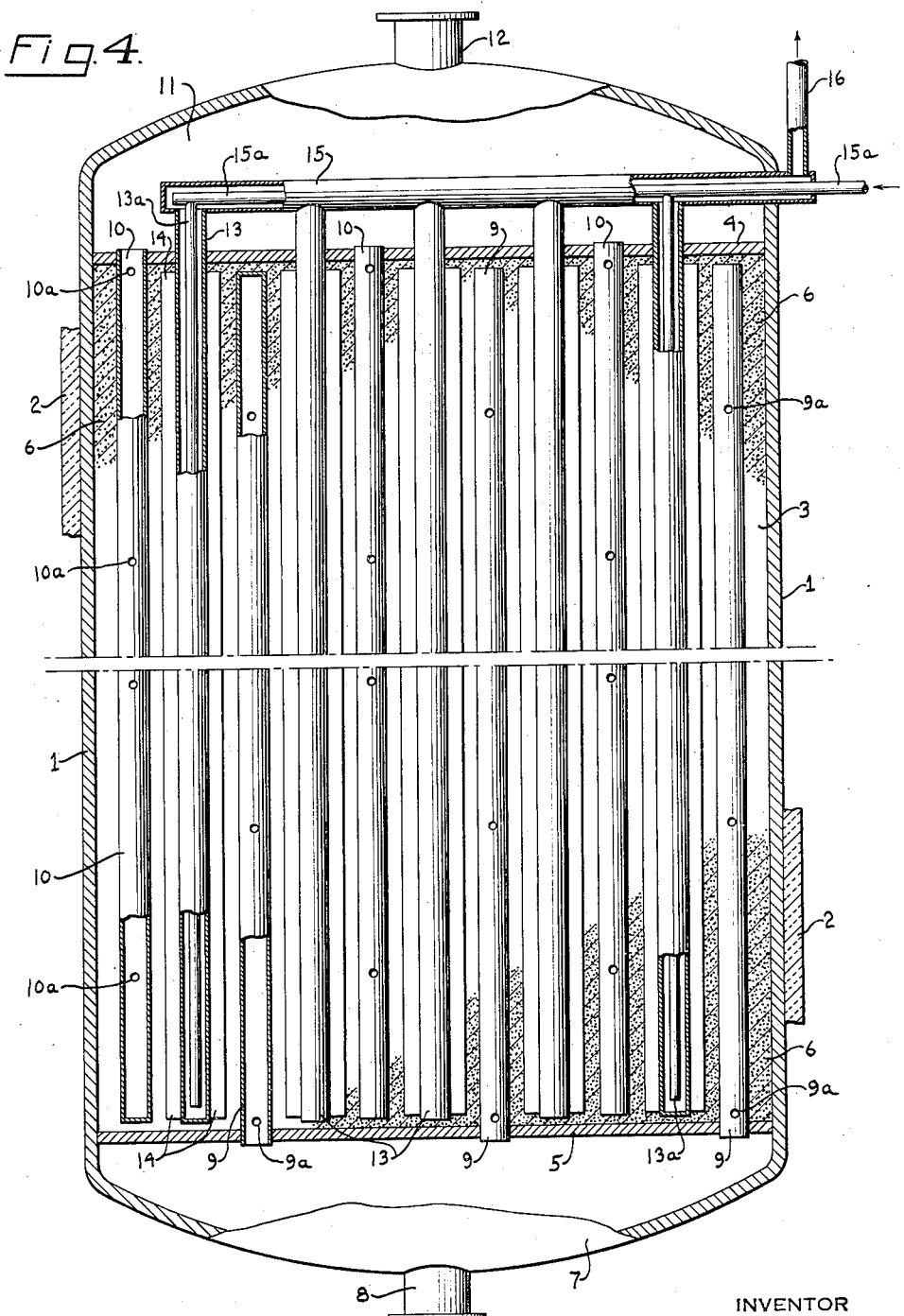
Fig. 4 is a vertical sectional view partly in elevation, on much larger scale, of an element of apparatus, i. e. a converter, which is diagrammatically illustrated in the other figures of the drawings.

Before going further with the description of Fig. 1, an illustrative form of each of the converters of Fig. 1 can be seen by reference to Fig. 4 in which the converter 1 is surrounded by any suitable insulation 2 and has a reaction chamber 3 bounded by upper tube sheet 4 and lower tube sheet 5 and containing any desired catalyst or contact material 6, which latter, for purposes of illustration in the present invention, may consist of a blend of silica with some other metalliferous material capable of rendering the whole mass active, for example, alumina with or without relatively small amounts of other metalliferous materials or oxidation promoters. Reactant material, for example, hydrocarbons such as a heated and vaporized gas oil fraction of petroleum, may be introduced into the lower manifolding chamber 7 of the converter through the tubular member 8 which is joined to the lower head of the converter. From manifolding chamber 7 the vaporous reactants may pass upwardly through the several conduits 9 and then pass through openings 9a of the latter into and through catalyst 6. From the latter, products of reaction may enter the conduits 10 through the openings 10a located therein and thence pass into upper manifolding chamber 11. Products of reaction may then leave the converter through the tubular member 12 which is joined to the upper head of the converter.

After a period on stream, the catalyst 6 will become contaminated or reduced in activity due to the accumulation of carbonaceous, sulphurous, or other deposits and a desirable procedure is to interrupt the introduction of hydrocarbon reactants and to flow a regenerating medium through the catalyst, for example after the manner above described in connection with the hydrocarbon reactants or in the reverse direction. A suitable regenerating medium is one comprising air or other oxygen-containing fluid. Where the oxygen-containing regenerating medium is passed into the lower manifolding chamber 7 of the converter, products of regeneration will be withdrawn from the upper manifold 11 of the converter, and where the regenerating medium is introduced into the upper manifolding chamber 11 of the converter, products of regeneration will be withdrawn from the lower manifolding chamber 7 thereof.

Time may be allowed intermediate alternate on-stream and regeneration periods for purging the reaction zone and manifolding chambers, as by evacuation, or by the use of steam or other relatively inert fluid, so as to prevent or minimize intermixture of the reactant fluids or products of reaction, on the one hand, with regenerating medium or products of regeneration, on the other. However, this is no part of the present invention and will not be described further herein. Such operations have been described heretofore, for example in Patent No. 2,073,638 issued to E. J. Houdry on March 16, 1937, in Patent No. 2,095,264, issued to Arthur E. Pew, Jr. on October 12, 1937 or in Patent No. 2,095,265, issued on the same date to J. Howard Pew.

In the conduct of such an operation, the on-stream period or conversion of hydrocarbons will have a substantially different heat of reaction than that encountered during each alternate period of regeneration, during which latter contaminants or combustible deposits are removed from the reaction zone or catalyst.

In the specific example just described, the conversion or cracking of hydrocarbons will have a relatively small and endothermic heat of reaction while each alternate period of regeneration will have a relatively large and exothermic heat of reaction. The temperature throughout each cycle of operation may be controlled as desired by the use of a heat exchange fluid, which latter may advantageously be such a material that it will remain completely or substantially completely in the liquid phase under temperatures encountered during its use. Illustrative of the heat exchange media which may be employed in controlling the temperature of the specific operation just illustrated above is a fused mixture of sodium and potassium hydroxides or of sodium nitrite and potassium nitrate of approximately eutectic proportions. The heat exchange medium, for example the fused hydroxides or salts specified, may be brought into heat exchange relation with the reaction zone and the contact material 6 by means of double or nested tubes 13, which may have any desirable arrangement of fin members 14 extending into the catalyst. Tubes 13 have inserts or inner tubes 13a, which latter may communicate with the interior coil 15a of tubular manifold 15. In the circulation of heat exchange medium or fused compounds, the same may be introduced through the manifold coil 15a, pass downwardly through tubular members 13a, then upwardly through the annular space provided between nested tubes 13 and 13a into the annular space provided between nested manifolds 15 and 15a, and then leave the latter through tube 16.

An important aspect of the present invention provides for circulating the heat exchange medium in heat exchange relation with the catalyst or reactants during only a portion of the cycle of operation. In the particular illustrative operation just described above, the heat exchange medium may be circulated through heat exchange tubes 13 during that portion of each cycle of operation in which the catalyst is undergoing regeneration and be allowed to remain in such tubes during on-stream periods or during other portions of each cycle of operation in a relatively or substantially quiescent state, that is, without any or without any substantial circulation. In this particular illustration, the fused salt will be heated up during each period of regeneration and then a portion of the heat stored in the same will be given up during each respective subsequent on-stream period to supply some or any part of the heat required for the on-stream reaction.

Returning again to Fig. 1, in commercial plants, such for example as those employed in the conversion and/or refining of petroleum or of other hydrocarbons, it is customary to employ several converters or reaction chambers in a battery and to arrange the cycle of operation of each in staggered relation to one or more or all of the others. For example, in the illustration shown where there are six converters, the cycle of each converter could be arranged (as is usual) so that each converter would go on stream at a different time, so that there is a uniform or equal interval of time between the successive initiation of on-stream periods in the several converters. Assuming by way of example that a 135 minute cycle of operation is employed and six converters are used, as shown, the cycles of operation of the several converters could be arranged in relation to each other so that one converter would go on stream every 22½ minutes and also so that one converter would go on regeneration every 22½ minutes.

Thus during one period of each cycle of operation there may be need for the addition of heat to maintain the reaction zone within the desired temperature range and during another period of the cycle there may be a need for the withdrawal of heat. This may be accomplished by flowing a heat exchange medium, such as fused salt, through or in heat exchange relation with the catalyst or reaction zone of each converter during a portion of each cycle of operation thereof. The heat exchange medium may pass from flow control reservoir 17 through lines 18a, 18b, 18c, 18d, 18e and 18f, through the respective converters 1, and heat exchange fluid passing out of heat exchange relation with the latter may be collected in manifold 19 and be passed through line 20 into the compartment 21a of the temperature control reservoir 21. From the latter, the heat exchange liquid may be forced by pump 22 through line 23 and then successively through heat exchangers 24 and 25 back into compartment 21b of the temperature control reservoir. By way of illustration, heat exchangers 24 and 25 may be employed for preheating regenerating medium and for generating steam, although other uses of these heat exchangers are also contemplated. From reservoir 21b, the heat exchange liquid may be forced by pump 26 through line 27 back into flow control reservoir 17 from which latter the heat exchange liquid may be circulated through and in heat exchange relation with the reaction zones of the several converters 1 during a desired portion of the cycle of each.

A preferred aspect of the present invention, as hereinbefore pointed out, is to effect circulation of heat exchange medium through each converter during only a portion of each cycle of operation. Hence suitable means must be provided for starting and stopping the flow of salt or other heat exchange medium at the times desired. This may be done manually but is preferably accomplished by means of an automatic cycle timer 28 (mechanical details of which are no part of the present invention) which is electrically connected to the several motorized valves 29a, 29b, 29c, 29d, 29e and 29f. One suitable operation provides for allowing fused salt or heat exchange medium to pass in heat exchange relation with the contact mass within each converter only during each regeneration period of the cycle or during a portion of each regenerating period. Hence in the illustration shown, there may, for example, be circulation of regenerating medium through only two converters at one time, the fused salt or the like remaining stagnant or quiescent within the heat exchange tubes of the other converters.

30a and 30b (Fig. 1) illustrate combustion cases through which regenerating medium may be passed from the several converters 1 so as to effect a further oxidation of the products of regeneration leaving each of the converters as is disclosed in the copending application of E. J. Houdry and Richard S. Vose, Serial No. 58,858, filed January 13, 1936, for Promotion of Chemical Reactions. Often only one of the combustion cases need be employed at any one time. This further oxidation is an exothermic reaction and the combustion cases may, for example, be of a construction similar to that of the converters illustrated in Fig. 4, or they may be of any other desired or modified construction in which provision for heat exchange is made. The apparatus of Fig. 1 provides for the passage of heat exchange liquid from the flow control reservoir 17 through the line 31 and then through and in heat exchange with either one or the other of combustion cases 30a and 30b, as desired. Heat exchange fluid leaving such combustion cases may enter manifold header 19 and then pass into reservoir 21 along with heat exchange fluid leaving the several converters 1.

Figure 1A:
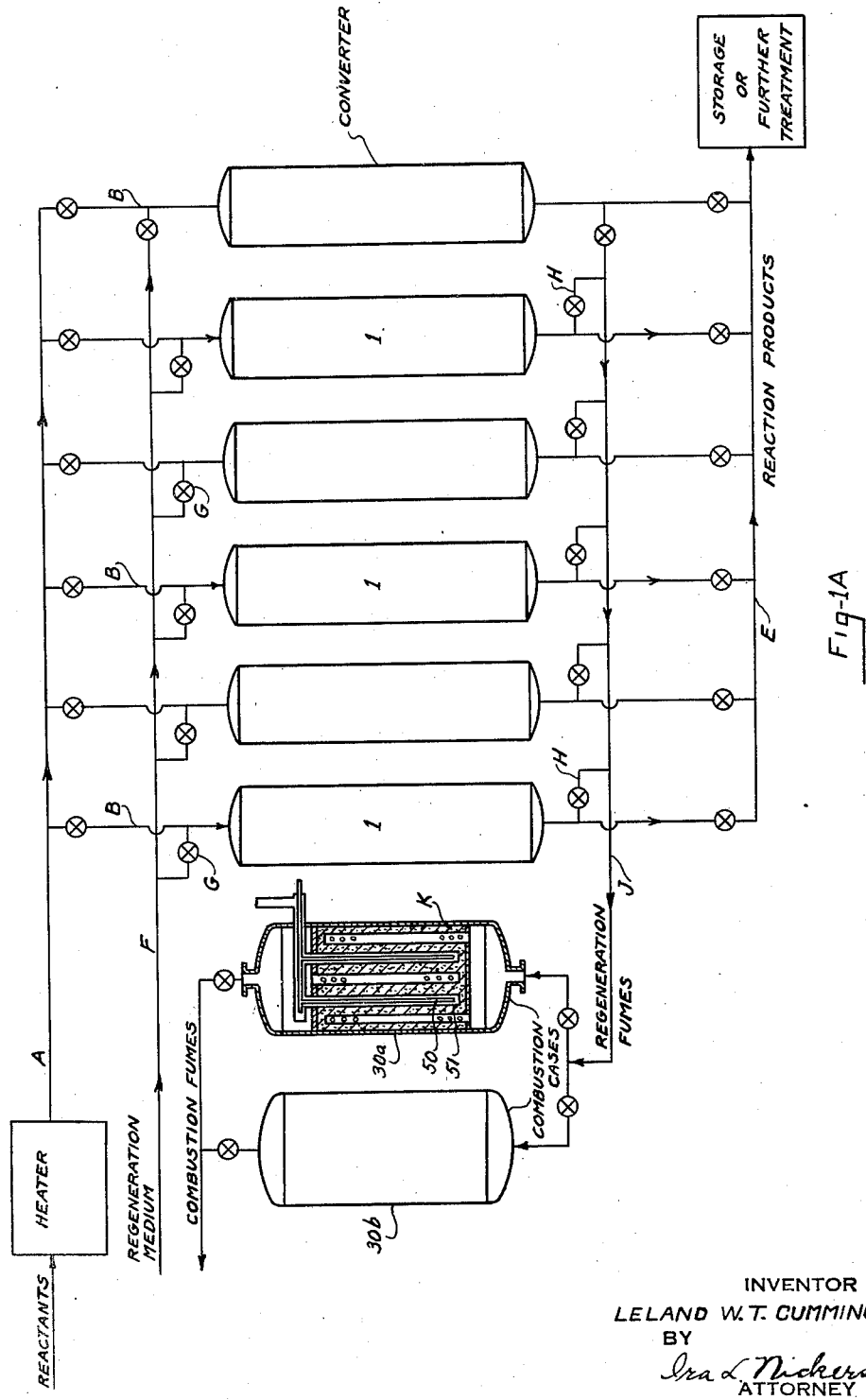
Fig. 1a is generally a diagrammatic view, with one of the combustion chambers vertically sectioned to show details thereof. The figure indicates the flow of reactants and reaction products to and from the converters as well as the flow of a regenerating medium to the converters and the flow of the regenerating fumes from the converters to the combustion chambers.

As disclosed in Fig. 1a, reactants are supplied through line A and valved branches B to the converters 1 and the products of reaction directed to C for storage or any further treating operation through valved branches D and line E while the regenerating medium will be supplied through line F and valved branches G and fumes of regeneration withdrawn, as desired, from any of the converters by the valved branches H and directed by means of the line J to either or both of the combustion chambers 30a or 30b, where the fumes can be further oxidized. One catalytic combustion chamber 30a is shown in detail in Fig. 1a and contains, as does the combustion chamber 30b, a suitable catalytic mass K comprising or containing metal oxides, including those of copper, iron, etc. for effecting combustion of any burnable components in the regeneration fumes including the conversion of the CO portion thereof into $CO_2$. The regeneration fumes entering the combustion cases 30a and/or 30b, may, as shown, be admitted at the bottom of the cases and at the temperature of regeneration, which is determined to an extent in accordance with the rate of flow of the heat exchange medium through the converters during the regeneration period and may range between approximately 500° F. (when there is much cooling) and 1100° F. (when there is relatively little cooling). The temperature at which the fumes leave a combustion case is determined similarly in accordance with the rate of flow of the heat exchange medium throuh the nested heat exchange tubes 50 and 51 in the combustion chamber and the burned fumes may sometimes leave the combustion cases at a temperature below that of the entering regeneration fumes, but their temperatures will usually be above the temperature of the entering regeneration fumes and, at times, they may attain a temperature as much as 400° higher.

The arrangement shown provides important economies of operation, minimizes pumping and power costs, and reduces the equipment required.

This will be appreciated by realizing that according to my invention, as above described, the heat exchange medium may, for example, flow through only two of the six converters shown or perhaps only through one of them at any one time. The pumps 22 and 26 may ordinarily be constant speed pumps. A constant level may be maintained in flow control reservoir 17 by providing an overflow line 32 to drain heat exchange medium when necessary, from reservoir 17 back into temperature control reservoir 21.

It is usual to have the heat exchange tubes 13 (Fig. 4) of such size and to have the rate of flow of heat exchange fluid so controlled as to regulate as desired the rise in temperature of the heat exchange fluid in passing in heat exchange with the catalyst within each case or converter. For example, in controlling hydrocarbon reactions of the type above illustrated, it is desirable to circulate the heat exchange fluid so that the latter undergoes an average temperature rise during regeneration periods of not more than approximately 50° F. However, while this is a preferred condition, the invention in its broader aspects is not limited to this feature of the control.

The volume of fused salt or other heat exchange medium which will be contained in all of the heat exchange tubes 13 within a single converter is an important feature and, if employed in operations of the type above discussed, is preferably of such magnitude that in the absence of any circulation during each endothermic period of reaction or conversion of hydrocarbons, the temperature of the reaction zone will change only through a relatively narrow range even though the hydrocarbon reactants are supplied to the reaction zone at a substantially constant temperature or within a limited temperature range which approaches or approximates temperature conditions desired during reaction. The liquid heat exchange medium or fused salt within the heat exchange tubes may have a heat carrying capacity or heat storage capacity which is greater than the combined heat storage capacity of the tubes and catalysts within the converters.

Figure 2:
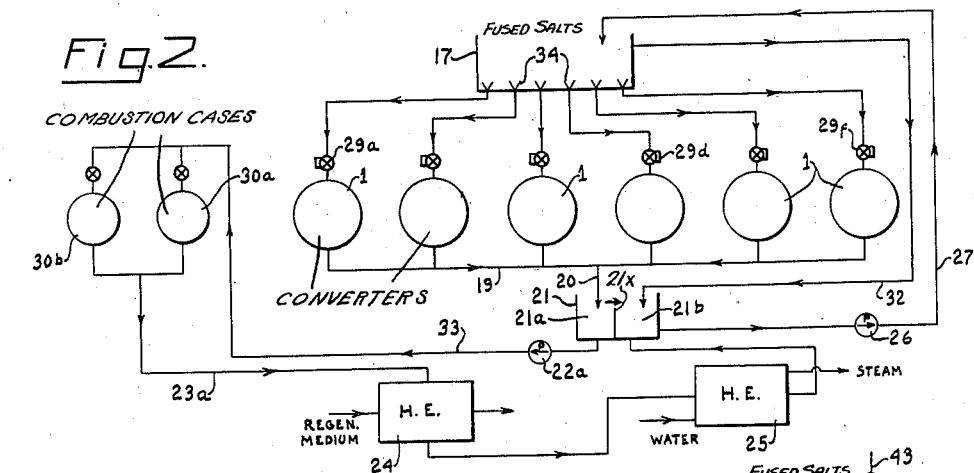
Fig. 2 is a modification of the apparatus shown in Fig. 1.

The apparatus schematically shown in Fig. 2 is quite similar to that shown in Fig. 1 and hence will be generally understood from the foregoing description. An important difference between the apparatus of Fig. 1 and Fig. 2, however, is that in Fig. 2 there is no flow of heat exchange liquid directly from flow control reservoir 17 to the combustion cases 30a or 30b. Before heat exchange liquid is sent in heat exchange relation with either of the combustion cases, it first passes through one or more of the converters 1, depending upon circumstances, and into the compartment 21a of temperature control reservoir 21. From the latter, the heat exchange liquid may be forced through line 33 by pump 22a into heat exchange relation with combustion case 30a and/or combustion case 30b and, from the latter, pass through line 23a and successively through heat exchangers 24 and 25 and then into compartment 21b of the temperature control reservoir 21. From there on, the operation of the apparatus illustrated in Fig. 2 will be understood by reference to the above description of Fig. 1.

Weirs or orifices 34 are schematically shown in the flow control reservoir of both Fig. 1 and Fig. 2 for controlling the rate of flow of heat exchange fluid through the several converters. It is desirable to maintain a constant or approximately constant rate of flow of the heat exchange medium through the tubes of each converter throughout each period of circulation and this rate of flow should preferably be equal or similar to that through each of the other converters when heat exchange fluid is being circulated therethrough.

In practical use one preferred arrangement of the apparatus is to have the flow control reservoir 17 located above the converters 1 in a manner so that a sufficient flow of heat exchange medium through the converters and into temperature control reservoir 21 will be accomplished by gravity flow. The valves 29a, 29b, etc., in such event, need not be employed to supply any throttling effect on the flow of heat exchange fluid but may be kept completely closed when no flow is desired through any particular converter or each respective valve may be kept completely open when flow therethrough is desired, the orifices 34 and the head of liquid provided by the gravity feed being relied upon to control the rate of flow of heat exchange liquid as desired.

The apparatus of Fig. 3 will also be generally understood from the description given hereinabove. Heat exchange fluid may be fed from the manifold 35 through the respective branch lines shown and through valves 29a, 29b, etc., through a selected one or more of the converters 1 and, if desired, may also be passed in parallel in heat exchange with combustion cases 30a and/or 30b by opening valve 36 in line 31a. However, where desired, valve 36 may be kept closed and a portion of the heat exchange fluid, which passes out of heat exchange relation with the converters 1 and through line 20a, may be passed through the line 33a, the valve in the line 33a being kept open and valve 36 being kept closed. This portion of the total heat exchange fluid circulated through converters 1, for example less than 20% of the total heat exchange fluid circulated through converters 1, and for example 10 or 15% thereof, after passing in heat exchange with one or both of the combustion cases 30a and 30b, may be returned through the lines 23a, 23b and be joined with the other 85%, or so, of the heat exchange fluid from the converters 1 which flows through the line 37. If this is done, then the stream of fluid flowing through line 38 will be divided and a minor proportion sent through line 39 and through heat exchangers 24 and 25 and the major proportion thereof sent through line 40, the heat exchange fluid again being recombined in line 41 and sent into surge tank 42, having valved air vent 43. From the surge tank 42, heat exchange liquid may be again forced into manifold 35 and through the system by pump 44.

In the arrangement last described, the relative division of flow through lines 39 and 40 will be determined by valve 45, which may be manually operated, but which is preferably a motorized valve which may be opened or closed any desired amount by a temperature-responsive means 46, which latter may establish or break electrical connections so as to turn the valve 45 in one way or another (i. e. open or close the same) in order to maintain a substantially constant temperature of the fluid flowing through line 41 to surge tank 42.

In place of recombining the fluid flow through lines 23a and 37, prior to passage of a portion of the total heat exchange fluid through heat exchangers 24 and 25, an alternative and preferred arrangement is to send all or substantially all of the fluid which passes in heat exchange with the combustion cases 30a and 30b through the line 47 and then through heat exchangers 24 and 25, all of the fluid flow through line 37 being caused to pass through line 40, for example by keeping valve 45 entirely closed. Where this latter and preferred alternative is employed, the temperature-responsive means 46 will be employed to control the operation of valve 48, which latter may be a motorized valve and subject to control as above described in connection with valve 45. When the temperature-responsive element 46 operates to close somewhat the valve 48 in line 37, this will cause a higher proportion of the total heat exchange fluid being circulated to pass through line 33a, through one or both of the combustion cases 30a and 30b, back through line 23a and line 47, and through the heat exchangers 24 and 25, thereby effecting a decrease in the temperature of fluid passing through line 41 into surge tank 42. On the other hand, where the temperature-responsive means operates to open somewhat the valve 48, then this will result in an increase of temperature of the fluid passing through line 41 into surge tank 42 for the reason that less heat exchange fluid will pass through the heat exchangers 24 and 25 and hence less heat will be extracted from the heat exchange fluid.

By way of a further and specific illustration but without in any way intending to limit the present invention, let us assume that the desired reaction consists of converting higher boiling hydrocarbons into lower boiling hydrocarbons in the presence of a catalyst such as a blend of silica and alumina which is located within each of the converters 1, this being a step accompanied by a low heat of reaction, specifically a relatively slight and endothermic heat of reaction. Also let us assume that the regeneration is conducted, as above illustrated, by periodically interrupting the flow of hydrocarbon reactants and passing an oxygen-containing gaseous regenerating medium through the converters so as to burn away or remove contaminants and undesirable deposits. Let us further assume that it is desired to carry out the conversion of hydrocarbons within a temperature range of the order of 800 to 900° F., and for example 825° to 835° F., while it is desired to conduct the regeneration within a temperature range located mainly above the lower end of the on-stream range and not higher than approximately 1100° F., e. g. mainly below 975° or 1025° F. For example, assume a fluctuation during regeneration within a range of approximately 150° F. Also assume, as above illustrated, that a fused salt which will remain substantially completely in liquid phase under the temperature conditions just indicated is employed as the heat exchange or temperature control fluid. In this event (referring for example to Fig. 1) the heat exchange fluid within the flow control reservoir 17 may be maintained at a temperature of, for example 825° F. and the rate of flow of heat exchange medium through converters 1 and the conditions of such heat exchange may be controlled so that the heat exchange fluid flowing through a plurality of converters at any one time undergoes an average rise in temperature of not more than approximately 50° F. and let us assume, for example, that it actually undergoes a rise of somewhat less than 50° F. so that the temperature in compartment 21a of temperature control reservoir 21 will be of the order of 860° F.; that is, a 35° F. rise in temperature of the salt is produced in passing through the converters. (It will be understood that the rise in temperature of salt passing through one case might be substantially more than 35° F. and of that flowing in heat exchange relation with a second converter much less than 35° F., at any one time, to make an average rise in temperature of about 35° F. Thus a peak of heat liberation in one converter will occur at a time when the rate of heat liberation in another converter which is in regeneration will be relatively low.) Let us also assume that the cases are on a 60 minute cycle of operation. Since there are six cases or converters illustrated in Fig. 1, one case could be put on stream every ten minutes and also one case be put on regeneration every ten minutes. Assuming that out of each 60 minute cycle, each case is on stream for about twenty minutes and in regeneration for about the same length of time, allowing the remainder of the cycle for valve operation and purging before and after the on-stream period (that is, between alternate on-stream and regeneration periods), one suitable and desired method of operation is to flow heat exchange medium through each of the converters 1 during only a minor part of the whole cycle of operation. A contemplated operation is to flow the heat exchange medium through each case substantially only during that portion of each cycle of operation while the converter is in regeneration and often the length of time during which the fused salt is circulated may be somewhat less than the entire length of the regeneration period. If each regeneration period should be twenty minutes, then fused salt might be passed in heat exchange with the catalyst within the respective converter for 18 minutes, more or less.

With the temperature in compartment 21a of temperature control reservoir 21 at about 860° F., a proportion of the order of 15% of the total heat exchange fluid fed into such compartment from line 20 may be withdrawn through line 23 by pump 22 and passed through heat exchanger 24. In passing through this heat exchanger the temperature of the fused salt may be reduced by an amount of the order of 25° to 35° F. and, if the heat exchanger 24 is being employed for further heating compressed air (which may already be at a temperature of the order of 300° to 400° F. as a result of compression) the air or regenerating medium in volumes sufficient for a commercial plant of the type illustrated may be heated from about 350° F. to about 800° F. as a result of the above indicated drop in temperature of the fused salt. Hence it will be noted that the air or oxygen-containing regenerating medium may thus be brought to a temperature at least approaching that desired before introduction into the converters for regeneration. The fused salt or heat exchange liquid leaving heat exchanger 24 at a temperature of about 830° F. may then be passed into heat exchanger 25. If this latter heat exchanger is employed in generating steam for use as process steam, etc., an efficient step of heat exchange is to produce enough steam under desired temperature and pressure conditions so as to effect a reduction in the temperature of the heat exchange liquid by an amount of the order of 200° F. This heat exchange fluid may continuously pass at this desired temperature from the heat exchanger 25 into compartment 21b of the temperature control reservoir 21. This relatively low temperature fused salt, when admixed with the other 85% or so of the salt which flows from compartment 21a over the weir 21x into compartment 21b, will provide a resultant temperature of approximately 825° F., the selected temperature at which to send such heat exchange fluid through the line 27 into the flow control reservoir 17.

In the illustration just given it will be seen that the fused salt is sent into heat exchange with desired ones of the several converters at a temperature within the desired on-stream temperature range and near the lower end thereof. It is generally preferred to send the heat exchange medium, during regeneration of the catalyst within any of the converters or reaction zones, in heat exchange relation with the latter at a temperature preferably within the on-stream temperature range, or permissibly somewhat below. While the broader aspects of the present invention comprehend passing the salt in heat exchange with converters 1 at a temperature above the on-stream range, ordinarily this occasions loss of economy in the operation and creates less desired conditions in maintaining temperatures during different phases of each cycle of operation within the ranges desired.

Figure 3:
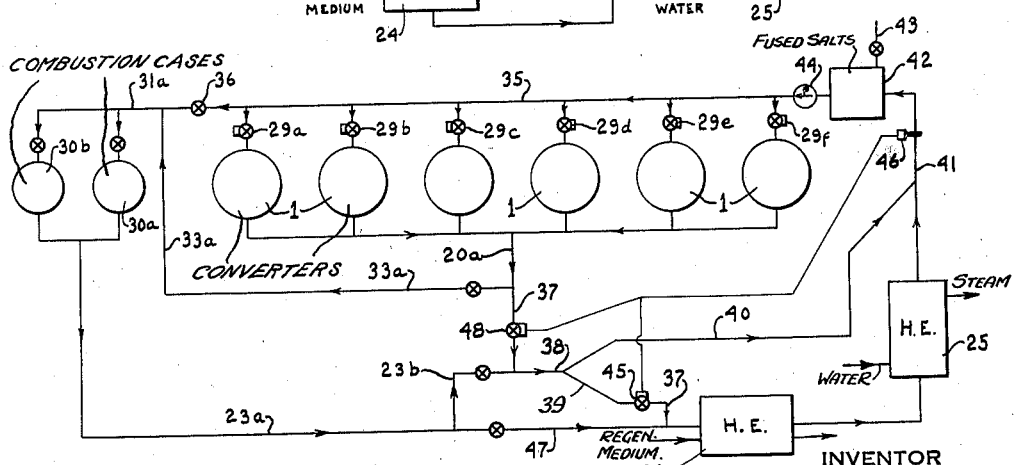
Fig. 3 is a further modification of apparatus shown in Figs. 1 and 2.

If the arrangement of apparatus as illustrated in Fig. 3 is employed, it will be clear that the valves 29a, 29b, 29c, etc. will have to serve to control the rate of flow of heat exchange liquid through the several converters 1 as desired.

Where the 60 minute cycle of operation (chosen above by way of specific illustration) is employed and each period of regeneration is approximately 20 minutes in length and the heat exchange fluid is circulated through each case for a time somewhat less than the regeneration period, the cycle of operation of each of the converters being staggered in uniform relation with respect to the others, it will be seen that at all times heat exchange liquid will be circulating through at least one of the converters 1 and, during the major portion of the time, fused salt will be circulated through two of the converters. However, as above pointed out, when heat exchange liquid is not being circulated through any converter it will, nevertheless, remain in a quiescent state in heat exchange relation therewith, for example within heat exchange tubes such as tubes 13 shown in Fig. 4. Any surges which may occur during the recurring cycles of operation of the battery of converters may be accommodated by surge tank 42 (Fig. 3) or by temperature control reservoir 21 (Figs. 1 and 2).

It will be understood that heat exchange tubes such as tubes 13 having inserts 13a (Fig. 4) are not essential but may be replaced by various other types of heat exchange tubes or structure. For example, the heat exchange tubes might consist of single tubes instead of the nested arrangement shown and might pass from one manifolding chamber to the other entirely through the reaction chamber, valves being provided to maintain the heat exchange tubes filled, or substantially filled, with heat exchange medium when circulation therethrough is not desired.

In the conduct of an operation as specifically illustrated just above where higher boiling hydrocarbons are being converted into lower boiling hydrocarbons (an endothermic reaction) and the catalyst or contact mass within each converter is being restored to activity in alternate periods of regeneration by passing an oxygen-containing regenerating medium therethrough at a temperature within or above the on-stream range, usual and preferred conditions of operation permit the catalyst and surrounding structure of each converter to rise within a temperature range of say 200° F., more or less, e. g. from 825° to 975° F., during each regeneration period and to fall within such range toward the end of the regenerating period so that when it is desired to again put that converter on-stream for the conversion of hydrocarbons it will be at substantially the top temperature of the desired on-stream range, e. g. 835° F. Such an operation, as will be seen, involves allowing the catalyst, surrounding structure of the converter, and fused salt which is maintained in a quiescent state in heat exchange relation therewith to drop within a predetermined and relatively narrow temperature range during each on-stream period (hence maintaining a substantially constant temperature for the desired reaction) and involves allowing the catalyst and the surrounding converter structure to rise within a greater temperature range during each period of regeneration, fused salt or other heat exchange medium, however, being circulated during each regeneration period so that (during circulation) the heat exchange liquid will not rise in temperature more than about 40 to 60° F. However, under different conditions or in different reactions, rises in temperature up to about 100° F. or more may occur.

While the present invention is not limited to the number of converters illustrated in the drawings or to any particular number, yet in an illustrative cyclic operation as just described it is desirable to have heat exchange liquid circulating through at least two converters during the major portion of the time, one converter being at a more advanced stage of the regeneration or reaction than the other or others.

It will be understood from the description as a whole and particularly from the appended claims that my invention is not to be limited by any of the illustrative description given hereinabove. All uses and embodiments within the scope of the appended claims are comprehended.

What I claim is:

1. In an operation involving the use of a contact mass within a confined reaction zone, the mass being employed in a cycle of operations comprising one period in which there is a greater heat of reaction and another period in which there is a lesser heat of reaction, said periods alternating with each other, the process steps for the regulation and temperature control of the cycle of operation which comprise circulating a heat exchange fluid in indirect heat exchange relation with the mass in said reaction zone during the period of greater heat of reaction, and during the period of lesser heat of reaction discontinuing the circulation of the heat exchange fluid and maintaining it substantially in liquid phase in indirect heat exchange relation with the mass.

2. In an operation involving the use of a contact mass within confined reaction zone, the mass being employed in a cycle of operation comprising one period in which there is a large heat of reaction and another period in which there is a relatively small heat of reaction, said periods alternating with each other, the process steps for the regulation and temperature control of such operation which comprises flowing one type of reactant fluid into said reaction zone and in contact with said mass during the period of said cycle having a large heat of reaction and circulating a heat exchange liquid through tubes extending within said reaction zone in heat exchange relation with said contact mass during the same period; during the aforementioned period having a relatively small heat of reaction sending a different reactant fluid into said reaction zone and in contact with said contact mass, and, during the last mentioned period, maintaining the heat exchange liquid aforesaid within said tubes in a substantially quiescent state, i. e. no substantial circulation of the same being effected, thereby to control efficiently the temperatures of said reaction zone and contact mass.

3. In an operation for the reaction or conversion of hydrocarbons involving the use of a transforming catalyst maintained within a confined reaction zone, the catalytic mass being employed in recurring cycles of operation, each comprising an on-stream period for the conversion of hydrocarbons having a relatively small heat of reaction and a regeneration period for restoring the catalyst to active condition and having a relatively large heat of reaction, the process steps for the regulation and temperature control of such operation which comprises sending hydrocarbon reactants into the reaction zone in contact with the catalyst during each on-stream period and withdrawing hydrocarbon products of reaction therefrom; during alternate periods of regeneration sending an oxygen-containing regenerating fluid into said reaction zone and in contact with said catalyst to restore the latter to active condition; during said regeneration periods circulating a heat exchange liquid through tubes extending within said reaction zone and being in heat-conducting relation with said catalyst, and during on-stream periods maintaining heat exchange liquid aforesaid within said tubes substantially without circulation, thereby to control efficiently the temperature of said catalyst throughout recurring cycles of operation.

4. In an operation for the reaction or conversion of hydrocarbons involving the use of a transforming catalyst or contact mass arranged in a plurality of separate confined reaction zones, the mass in each of said confined zones being employed in a cycle of operation in which periods of regeneration having a relatively large and exothermic heat of reaction alternate with on-stream or conversion periods having a relatively small heat of reaction, the process steps for the control and temperature regulation of such operation which comprises differently timing the cycle of operation of separate reaction zones with respect to each other so that one reaction zone is in regeneration while another is on stream, sending hydrocarbon reactants into contact with the catalyst within each reaction zone when each respective reaction zone is on stream and withdrawing fluid products of reaction therefrom; during alternate periods of regeneration sending an oxygen-containing regenerating fluid into each respective reaction zone and in contact with the catalyst therein to restore the latter to active condition; during regeneration periods of each reaction zone circulating a heat exchange fluid through tubes extending within said reaction zone in heat exchange relation with said catalyst, and during alternate on-stream periods maintaining said heat exchange fluid within said tubes without substantial circulation, said heat exchange fluid being of a type which will remain substantially completely in liquid phase throughout its use, thereby to control efficiently the above-described operation.

5. Operation as defined in claim 4 in which the said heat exchange fluid is composed of fused salt.

6. In a transforming operation involving the use of a catalytic mass arranged in a plurality of separate confined reaction zones, the mass in each of said confined zones being employed in a cycle of operation in which periods of regeneration having a relatively large and exothermic heat of reaction alternate with on-stream or conversion periods having a relatively small heat of reaction, the process steps for the regulation and temperature control of such operation which comprises differently timing the cycle of operation of each reaction zone with respect to another so that the regeneration period in each zone begins at a different time than in the others, flowing a heat exchange liquid in heat exchange relation but out of contact with the mass in each of said zones substantially only during the regeneration period of the cycle thereof but maintaining said heat exchange liquid in heat exchange relation with said mass during other portions of said cycle of operation, and allowing the mass in each zone to change through a temperature range during the on-stream periods to supply heat of reaction of each on-stream or conversion period.

7. Process as described in claim 6 further characterized in that the heat exchange fluid is circulated in heat exchange relation with the mass within each reaction zone for only a portion of the period of regeneration thereof.

8. Process as defined in claim 6 further characterized in that the heat exchange fluid is circulated in heat exchange relation with the mass within each reaction zone for only a part of the entire cycle of operation thereof, said part being less than half of the time of the entire cycle of operation.

9. In an operation for the reaction or conversion of hydrocarbons involving the use of a transforming catalyst or contact material within a confined reaction zone, the catalyst being employed in recurring cycles of operation, each involving an on-stream period for the conversion of hydrocarbons having a relatively small and endothermic heat of reaction and a regeneration period for restoring the catalyst to active condition and having a relatively large and exothermic heat of reaction, the steps of process which comprise maintaining said catalyst throughout at least a predominant proportion of each cycle of operation within a temperature range of about 200° F., said temperature range lying mainly above 800° F.; during each on-stream period sending hydrocarbon reactants into said reaction zone in contact with said catalyst and withdrawing fluid products of reaction therefrom; during alternate periods of regeneration sending an oxygen-containing regenerating fluid into said reaction zone and in contact with said catalyst to restore the latter to active condition; during each of said regeneration periods allowing the temperature of the catalyst to rise and controlling the rise in temperature by circulating a heat exchange liquid through tubes extending within said reaction zone in heat exchange relation with said catalyst; and during each alternate on-stream period maintaining heat exchange liquid within said tubes but without substantial circulation so as to restrict the drop in temperature of said catalyst during the endothermic conversion of the said hydrocarbon reactants, thereby to control efficiently the above described operation.

10. Process as described in claim 9 in which the heat exchange liquid is circulated in heat exchange relation with the catalyst or contact material of a plurality of converters during regeneration periods thereof under conditions so that said heat exchange liquid does not undergo an average rise in temperature of more than about 50° F. during its passage in heat exchange with said catalyst.

11. Process as defined in claim 9 further characterized in that heat exchange fluid brought into heat exchange relation with the catalyst or contact mass is at a temperature, preliminary to heat exchange, which is within or below the on-stream temperature range.

12. In an operation involving the use of contact mass arranged in a plurality of separate confined zones, the mass in each zone being employed in a cycle of operation covering one period of greater heat of reaction alternating with a period of lesser heat of reaction, the process steps for the regulation and temperature control of such reactions which comprise differently timing the cycle of operations so that the period of greater heat of reaction in one zone begins at a different time than in another zone, flowing a heat exchange fluid in heat exchange relation but out of contact with the mass in each of said zones substantially only during the period of the cycle thereof in which there is the greater heat of reaction, stopping the flow of the heat exchange fluid so that it is maintained quiescent and in indirect heat exchange relation with the contact mass in order to allow the temperature of the mass in each zone to change through a temperature range during the period of the cycle thereof in which there is the lesser heat of reaction, said heat exchange fluid being of a type which will remain substantially completely in liquid phase during the period of the cycle having the lesser heat of reaction.

13. In an operation for the reaction or conversion of hydrocarbons involving the use of a transforming catalyst or contact mass arranged in a plurality of at least three separate confined reaction zones, the mass in each of said confined zones being employed in a cycle of operation in which periods of regeneration having a relatively large and exothermic heat of reaction alternate with on-stream or conversion periods having a relatively small heat of reaction, the process steps for the control and temperature regulation of such operation which comprises differently timing the cycle of operation of separate reaction zones with respect to each other so that one reaction zone is in regeneration while another is on stream and so that at least two reaction zones are in regeneration during a major portion of the time of operation, one of said two reaction zones being at a more advanced stage of the regeneration period than another, sending hydrocarbon reactants into contact with the catalyst within each reaction zone when each respective reaction zone is on stream and withdrawing fluid products of reaction therefrom while maintaining a heat exchange fluid in a quiescent state in heat exchange relation with the contact mass; during alternate periods of regeneration sending an oxygen-containing regenerating fluid into each respective reaction zone and in contact with the catalyst therein to restore the latter to active condition; and passing gaseous products of regeneration from said reaction zones through a combustion zone containing a catalyst capable of promoting a further combustion of said products of regeneration; during regeneration periods of each reaction zone circulating the heat exchange fluid in heat exchange relation with the catalyst located therewithin, whereupon said fluid rises in temperature, then sending a minor proportion of the heat exchange fluid leaving said reaction zones in heat exchange relation with the catalyst within said combustion zone, whereupon said heat exchange fluid rises further in temperature; then sending the last-mentioned heat exchange fluid through at least two heat exchangers in succession, in the first of which gaseous regenerating medium under desired pressure is heated and in the latter or last of which the temperature of the heat exchange fluid is reduced to a temperature substantially below that at which it is desired to again circulate heat exchange fluid in heat exchange relation with said reaction zones; admixing the latter with the remainder of heat exchange fluid from said reaction zones and again flowing the recombined heat exchange fluid in heat exchange relation with the catalyst within said reaction zones, thereby to efficiently control the above described operation.

14. In an operation for the reaction or cracking of hydrocarbons involving the use of an adsorptive silicious cracking catalyst or contact material arranged in a plurality of separate confined reaction zones, the mass in each of said confined zones being employed in a cycle of operation in which periods of regeneration having a relatively large and exothermic heat of reaction alternate with on-stream or conversion periods having a relatively small and endothermic heat of reaction, the steps of process which comprise differently timing the cycle of operation of separate reaction zones with respect to each other so that one reaction zone is in regeneration while another is on stream, maintaining said catalyst largely throughout each cycle of operation within the temperature range of 800° to 1100° F., during on-stream periods of each reaction zone sending hydrocarbon reactants thereinto in contact with the catalyst located therein and withdrawing fluid products of reaction therefrom; during alternate periods of regeneration sending an oxygen-containing regenerating fluid into each respective reaction zone and in contact with the catalyst therein to restore the latter to active condition and passing fumes of regeneration therefrom through a combustion zone containing a catalyst capable of promoting a further combustion of oxidizable materials therein to increase its energy; during regeneration of the catalyst within each reaction zone circulating streams of fused salt in heat conducting relation but out of contact with said catalyst so as to withdraw heat therefrom and control the rise in temperatures of the same, said fused salt being sent into heat exchange with said catalyst at temperature within or below the desired on-stream temperature range and being circulated so that it will undergo an average rise in temperature of not more than approximately 50° F. during such heat exchange; then sending fused salt from the reaction zones in heat exchange relation with the catalysts of a combustion zone in order to condition the same and during alternate on-stream periods maintaining the aforesaid fused salt in a substantially quiescent state in heat exchange relation with the catalysts within respective confined reaction zones, so as thereby to furnish a substantial part of the endothermic heat required for each respective on-stream reaction.

15. Apparatus for the treatment of fluids under controlled temperature conditions which comprises a plurality of converters each having a reaction chamber containing contact material, means for selectively supplying fluid reactants to each of said reaction chambers for carrying out a cycle of alternate reactions, said cycle comprising one period having a greater heat of reaction and one period having a lesser heat of reaction, and means for withdrawing products of the reactions, a set of heat exchange tubes in each reaction chamber, a chamber for supplying heat exchange fluid to the sets of tubes, means for circulating the heat exchange fluid through tubes of the chambers during the period of the cycle having the greater heat of reaction, means for maintaining the heat exchange fluid quiescent in the tubes of the chambers during the period having the lesser heat of reaction, a heat exchange fluid reservoir having a partition therein providing independent compartments, a fluid temperature adjusting circuit interconnecting the compartments, one of said compartments for receiving the heat exchange fluid after circulation through said heat exchange tubes and the other for receiving the fluid after its temperature is adjusted, and means for finally returning the heat exchange fluid to the supply chamber.

16. Apparatus for the treatment of fluids under controlled temperature conditions which comprises a plurality of reaction cases, each having a reaction chamber containing a catalyst, means for introducing fluid reactants into each of said reaction chambers during chosen periods and means for withdrawing products of reaction therefrom; tubes for heat exchange fluid positioned in heat-conducting relation with the catalyst within each of said reaction chambers, a combustion case containing a contact material capable of promoting oxidation of combustible gases, means for selectively passing gaseous products from any desired one or more of said reaction chambers into said combustion case, means for circulating heat exchange fluid through the aforesaid tubes, means including conduits for withdrawing heat exchange fluid from said tubes; means for passing a portion only of said heat exchange fluid in heat-conducting relation with said contact material within said combustion zone and then through heat exchange means to readjust the temperature of said fluid and means including a duct for passing the remainder of said heat exchange fluid, together with the aforesaid portion leaving said heat exchange means, back into the aforesaid tubes; and valve means for periodically stopping the flow of heat exchange fluid through certain of the aforesaid tubes, which are in heat-conducting relation with the catalyst in one reaction chamber, while such fluid is permitted to continue to flow through other of said tubes located in heat conducting relation with the said catalyst within another of said reaction chambers.

LELAND W. T. CUMMINGS.